US011360024B1

(12) United States Patent
Margraf (10) Patent No.: US 11,360,024 B1
(45) Date of Patent: Jun. 14, 2022

(54) MEASUREMENT ARRANGEMENT FOR MEASURING DIFFUSELY REFLECTED LIGHT AND SPECULARLY REFLECTED LIGHT

(71) Applicant: Carl Zeiss Spectroscopy GmbH, Jena (DE)

(72) Inventor: Joerg Margraf, Koenigsee—Rottenbach (DE)

(73) Assignee: CARL ZEISS SPECTROSCOPY GMBH, Jena (DE)

( * ) Notice: Subject to any disclaimer, the term of this patent is extended or adjusted under 35 U.S.C. 154(b) by 0 days.

(21) Appl. No.: 17/579,959

(22) Filed: Jan. 20, 2022

(30) Foreign Application Priority Data

Jan. 26, 2021 (DE) .................... 10 2021 101 594.4

(51) Int. Cl.
  *G01N 21/47* (2006.01)
  *G01J 3/02* (2006.01)
  *G01N 21/25* (2006.01)

(52) U.S. Cl.
  CPC .......... *G01N 21/474* (2013.01); *G01J 3/0205* (2013.01); *G01N 21/255* (2013.01)

(58) Field of Classification Search
  CPC ... G01N 2021/4723; G01N 2021/4721; G01N 2021/556; G01N 21/57
  See application file for complete search history.

(56) References Cited

U.S. PATENT DOCUMENTS

| | | | | |
|---|---|---|---|---|
| 4,285,597 A | * | 8/1981 | Lamprecht | G01N 21/57 250/234 |
| 4,750,140 A | * | 6/1988 | Asano | G01N 21/57 356/445 |
| 5,252,836 A | * | 10/1993 | Matthews | G01N 21/8986 250/559.44 |
| 5,943,127 A | * | 8/1999 | Feldman | G01N 21/55 356/73 |

(Continued)

FOREIGN PATENT DOCUMENTS

| | | |
|---|---|---|
| CN | 210119290 U | 2/2020 |
| DE | 34 31 367 A1 | 2/1986 |

(Continued)

*Primary Examiner* — Shawn Decenzo
(74) *Attorney, Agent, or Firm* — Mayer & Williams PC; Stuart H. Mayer (57) ABSTRACT

A measurement arrangement for measuring diffusely reflected light and specularly includes a measurement light source for generating measurement light, an optical receiver for receiving measurement light, and a first mirror for reflecting the measurement light emerging from the measurement light source. The measurement arrangement additionally comprises a second mirror for reflecting diffusely reflected measurement light to the optical receiver. A settable third mirror is also provided, which in a first position is aligned for directing the measurement light that was directed onto a sample by the first mirror and specularly reflected by the sample to the optical receiver. The third mirror in a second position releases a beam path between the second mirror and the optical receiver, so that the measurement light directed onto the sample by the first mirror and (Continued)

diffusely reflected by the sample to the second mirror is directed to the optical receiver by the second mirror.

10 Claims, 8 Drawing Sheets

(56) References Cited

U.S. PATENT DOCUMENTS

| | | |
|---|---|---|
| 6,422,718 B1 | 7/2002 | Anderson |
| 2001/0033382 A1* | 10/2001 | Preston .................. G01N 21/57 |
| | | 356/445 |
| 2005/0083530 A1* | 4/2005 | Ogihara ............. G01N 21/5907 |
| | | 356/446 |
| 2006/0256341 A1* | 11/2006 | Kuwada ................. G01N 21/57 |
| | | 356/445 |
| 2014/0362377 A1* | 12/2014 | Hegstrom .......... G01N 21/4738 |
| | | 356/343 |
| 2018/0017486 A1* | 1/2018 | Ser ..................... G01N 21/4738 |
| 2018/0066988 A1* | 3/2018 | Margraf ................. F21V 7/043 |
| 2019/0129674 A1* | 5/2019 | Kuwada ................. G01N 21/00 |

FOREIGN PATENT DOCUMENTS

| | | |
|---|---|---|
| DE | 20 2008 012 222 U1 | 1/2009 |
| DE | 10 2010 041 749 A1 | 4/2012 |
| DE | 10 2011 050 969 A1 | 5/2013 |
| DE | 10 2013 219 830 A1 | 4/2015 |
| DE | 10 2014 215 193 A1 | 2/2016 |
| DE | 10 2016 116 405 A1 | 3/2018 |
| DE | 10 2019 107 963 A1 | 10/2020 |
| EP | 3 290 904 A2 | 3/2018 |

* cited by examiner

MEASUREMENT ARRANGEMENT FOR MEASURING DIFFUSELY REFLECTED LIGHT AND SPECULARLY REFLECTED LIGHT

BACKGROUND OF THE INVENTION

The present invention relates to a measurement arrangement for measuring diffusely reflected light and specularly reflected light, which is reflected in each case by a sample. The measurement arrangement is used in particular for the spectroscopic examination of surfaces in production processes, for example to determine the reflection properties of glass coatings, film coatings or architectural glass.

DE 10 2011 050 969 A1 shows an apparatus for the referenced measurement of reflected light with a hollow body, which has a diffusely scattering layer in its interior and a light exit opening. The apparatus can be switched from a measurement position to a calibration position, whereby the light exit opening is moved from a first detection axis to a second detection axis.

DE 10 2010 041 749 A1 discloses a measurement device with a cavity extending in a longitudinal direction, which has an opening to be turned toward a sample and a multiplicity of openings arranged in the longitudinal direction. A further opening is used to couple in light.

U.S. Pat. No. 6,422,718 B1, DE 34 31 367 A1, and DE 20 2008 012 222 U1 show measurement light sources in different embodiments.

DE 10 2013 219 830 A1 teaches an optical apparatus for reflection measurement under diffuse illumination, which comprises a hollow body with a light-scattering surface in its interior and with a light exit opening. The light exit opening has a rotationally asymmetrical shape.

DE 10 2014 215 193 A1 illustrates a measurement arrangement for capturing an absolute reflection spectrum of a sample. This measurement arrangement comprises a light source and a homogenizer for generating a uniform spatial illuminance distribution of the measurement light. The measurement arrangement further comprises a movable reflector and a receiver. The reflector is arranged on the same side of the sample as the light source. The homogenizer is preferably formed by an integrating sphere, an integrating tube or a ball-cylinder construction.

DE 10 2016 116 405 A1 and EP 3 290 904 A2 relate to a measurement light source for generating measurement light having a uniform spatial illuminance distribution. The measurement light source comprises a hollow body with a diffusely reflective inner surface. A concave illumination space, a tubular light shaping space, and a concave light exit space, which have a common axis, are formed in the hollow body. A light source for generating light is at least partially arranged in the illumination space. The illumination space and the light exit space lie opposite each other with their concave mirror shapes and are connected by the tubular light shaping space. EP 3 290 904 A2 also shows various measurement arrangements for capturing an absolute reflection spectrum of a sample and for performing a reference measurement.

CN 210119290 U and DE 10 2019 107 963 A1 illustrate a measurement light source for generating measurement light having a uniform spatial illuminance distribution. The measurement light source comprises a solid block, in which an illumination space, a light shaping space, and a light exit space are each designed as a cavity in the block and have a diffusely reflective inner surface. The illumination space opens into the light shaping space. The light shaping space opens into the light exit space. At least one light source for generating light is at least partially arranged in the illumination space. The light exit space has a light exit. An axis of the illumination space and an axis of the light exit space are arranged at a distance from one another. The light shaping space is designed for a reversal of a light propagation direction. Furthermore, a measurement arrangement for capturing an absolute reflection spectrum of a sample is described. The measurement arrangement is used in particular for the spectroscopic examination of surfaces in production processes, for example to determine the color or gloss of the surfaces.

SUMMARY OF THE INVENTION

The object of the present invention proceeding from the prior art is that of providing a measurement arrangement for capturing diffusely reflected light and specularly reflected light, which is realizable to be compact and with which even comparatively small intensities of the diffusely reflected light are measurable, with the result that, for example, architectural glass or display glass can be measured.

The specified object is achieved by a measurement arrangement as claimed in the attached claim 1.

The measurement arrangement is used to measure diffusely reflected light and specularly reflected light, which is reflected in each case by a sample. The measurement arrangement is used, for example, for an inline measurement in a production process for large coated surfaces, such as glass panes or films for testing the surface. The specularly reflected light is light that is reflected by the sample by way of a mirror reflection in which the entrance angle is the same as the exit angle, which means the reflection is directional. In other words, specular reflection can also be referred to as mirror reflection, direct reflection, or regular reflection. In the case of diffuse reflection, by contrast, light is reflected in all directions.

The measurement arrangement is preferably used for capturing the absolute reflection spectrum of the light reflected diffusely by the sample and/or for capturing the absolute reflection spectrum of the light reflected specularly by the sample. A reference sample is preferably not necessary for these measurements. The measurement arrangement therefore preferably also allows a reference measurement of measurement light used.

The measurement arrangement first comprises a measurement light source for generating measurement light. The measurement light has a uniform spatial illuminance distribution. The measurement light source has a light exit for the emergence of the measurement light.

The measurement arrangement further comprises an optical receiver for receiving light, which is arranged opposite the measurement light source. The light to be received is the measurement light from the measurement light source after it has traveled along a path via the sample or via a reference path. An entrance opening of the receiver and an exit opening of the measurement light source are directed toward one another, apart from an offset.

The measurement arrangement is designed to be arranged parallel to a surface of the sample. In particular, an axis of the light exit should be arranged parallel to the surface of the sample, to be precise with an offset with respect to the surface of the sample.

The measurement arrangement comprises a first mirror, which is arranged on the axis of the light exit of the measurement light source and is aligned for reflecting the measurement light from the measurement light source emerging from the light exit. The first mirror is preferably arranged rigidly. The first mirror preferably has a spherical curvature. A lens element for enlarging the beam of the measurement light emerging from the light exit is preferably arranged between the light exit and the first mirror.

The measurement arrangement also comprises a second mirror, which is arranged on an axis of the optical receiver and is aligned for reflecting diffusely reflected measurement light to the optical receiver. The second mirror is preferably arranged rigidly. The second mirror is preferably arranged between the measurement light source and the optical receiver, but not between the light exit of the measurement light source and the entrance opening of the optical receiver.

The measurement arrangement also comprises a third mirror, which is mechanically settable in at least two positions, for which purpose the third mirror is preferably pivotable or rotatable. The third mirror is preferably settable in at least three positions. In a first position of the third mirror, the latter is aligned for directing the measurement light from the measurement light source that was directed onto the sample by the first mirror and specularly reflected by the sample to the optical receiver so that it can be measured by the optical receiver. In a second position of the third mirror, the third mirror releases a beam path between the second mirror and the optical receiver, that is to say that the third mirror is pivoted out of the beam path between the second mirror and the optical receiver. In the second position of the third mirror, the third mirror releases in particular the beam path between the second mirror and the entrance opening of the optical receiver, that is to say that the third mirror is pivoted out of the beam path between the second mirror and the entrance opening of the optical receiver. Consequently, the measurement light from the measurement light source that was directed by the first mirror onto the sample and diffusely reflected by the sample toward the second mirror is directed by the second mirror to the optical receiver so that it can be measured by the optical receiver.

The third mirror is thus used in the measurement of the specularly reflected light but not in the measurement of the diffusely reflected light. The third mirror is therefore only weakly reflective and has a reflectance of at most 0.5 (=50%). The specularly reflected light is thereby significantly attenuated, while the diffusely reflected light is not attenuated by any special measure, which means that, after the diffuse reflection, it arrives at the optical receiver almost without attenuation. By contrast, typical mirrors have a reflectance of between 0.9 and 1. The measurement arrangement is provided in particular for measuring samples that significantly more strongly reflect specularly than they reflect diffusely. The size ratio between the light reflected specularly by the sample and the light reflected diffusely by the sample is preferably between 100:1 and 10 000:1, with particular preference between 1000:1 and 5000:1. Due to the described attenuation, the size ratio between the specularly reflected light arriving at the optical receiver and the diffusely reflected light arriving at the optical receiver is smaller, with the result that this size ratio approaches the value 1:1. Hereby, the measurement of the reflected light with the optical receiver is possible with a greater accuracy because the dynamic range occurring is smaller than before the attenuation.

The measurement arrangement has the advantage that it is suitable for measuring samples that reflect much less diffusely than specularly, without two optical receivers being necessary herefor.

In preferred embodiments, the third mirror has a reflectance of at most 0.1 (=10%), as a result of which the attenuation is even greater. In particularly preferred embodiments, the third mirror has a reflectance of at most 0.05 (=5%), as a result of which the attenuation is even greater. The reflectance is preferably 0.04 (=4%). The third mirror is preferably formed by a black glass.

In preferred embodiments, the measurement light directed onto the sample by the first mirror has an angle of incidence with respect to a vertical aligned perpendicularly to the sample. The vertical is preferably also aligned perpendicularly to the axis of the measurement light source and perpendicularly to the axis of the optical receiver. The measurement light directed onto the sample by the first mirror is incident on the sample at a vertical foot point of the vertical. The angle of incidence is preferably between 5° and 20°, and with particular preference between 8° and 12°. The dimensioning of the angle of incidence in said ranges allows first the measurement of the diffusely reflected light and the specularly reflected light and also a compact design of the measurement arrangement. The angle of incidence is with particular preference 10°.

A connecting line between the vertical foot point of the vertical and a center of the second mirror has an angle with respect to the vertical that represents an exit angle for the diffusely reflected measurement light to be measured. The exit angle is preferably between 25° and 40°, and with particular preference between 33° and 38°. The exit angle is with particular preference 35°.

The sum of the entrance angle and of the exit angle is with particular preference 45°. In this way, a standardized measurement of the light reflected diffusely by the sample can be performed.

Preferred embodiments of the measurement arrangement comprise a gloss trap arranged on the side of the vertical on the sample that is opposite the second mirror. The gloss trap can also be referred to as a light trap. The gloss trap is designed to absorb light, so that nearly no light that could disturb the measurement of the diffusely reflected light is incident from there onto the sample. A connecting line between the vertical foot point of the vertical and the gloss trap has an angle with respect to the vertical on the sample that is preferably identical to the exit angle of the diffusely reflected light with respect to the second mirror. The gloss trap preferably comprises a stop as light protection and shade provider, with the result that shading against light that is incident on the measurement arrangement from the outside is provided. The gloss trap preferably has a U-shaped cross section, wherein one leg of the U shape forms the stop. The interior of the U shape is preferably designed to absorb light.

The axis of the light exit of the measurement light source, a first vertical on the first mirror, a second vertical on the second mirror, a third vertical on the third mirror, and the axis of the optical receiver are preferably arranged in one plane. The vertical that is perpendicular to the sample is preferably also arranged in said plane. The gloss trap is preferably also arranged in said plane.

The third mirror is preferably settable or pivotable in three positions. In a third position of the third mirror, the latter is aligned for directing the measurement light that was reflected by the first mirror to the optical receiver so that it can be measured by the optical receiver. The measurement light is thus measured immediately without it having been reflected by the sample, which represents a bright measurement. This allows a comparison with the light reflected by the sample.

The third mirror is preferably settable or pivotable in four positions. In a fourth position of the third mirror, the latter is aligned for reflecting the measurement light that was reflected by the first mirror back to the first mirror. Consequently, no measurement light passes from the measurement light source directly or indirectly via the sample to the optical receiver. This allows a dark measurement. In its fourth position, the third mirror acts as a shutter.

The third mirror is preferably pivotable about a pivot axis in order to be able to be set in the at least two positions. The pivot axis is preferably aligned perpendicularly to the plane in which the axis of the light exit of the measurement light source, the first vertical on the first mirror, the second vertical on the second mirror, the third vertical on the third mirror, and the axis of the optical receiver are arranged. The pivot axis is preferably arranged between the axis of the light exit of the measurement light source and the axis of the optical receiver.

In preferred embodiments of the measurement arrangement, the optical receiver forms a first optical receiver, while the measurement arrangement comprises a second optical receiver. The second optical receiver is arranged on a side of the sample opposite the first optical receiver. The first optical receiver, the measurement light source, the first mirror, the second mirror, and the third mirror are thus located on one side of the sample while the second optical receiver is located on the other side of the sample. The measurement light directed onto the sample by the first mirror is also directed through the sample to the second optical receiver. Consequently, the sample is located between the first mirror and the second optical receiver. The second optical receiver is therefore embodied for measuring the light transmitted through the sample. An axis of the second optical receiver is preferably located in the plane in which the axis of the light exit of the measurement light source, the first vertical on the first mirror, the second vertical on the second mirror, the third vertical on the third mirror, and the axis of the first optical receiver are arranged.

The optical receiver or the optical receivers is/are preferably formed in each case by an optical sensor, such as in particular a spectrometer, or at least by an optical input of the optical sensor. For example, the optical receiver can be formed by an input optical unit to which an optical waveguide, which leads to a spectrometer, is connected. The second optical receiver, if present, is likewise preferably formed by an optical sensor, such as in particular a spectrometer.

The measurement light source, the optical receiver, in particular the first optical receiver, the first mirror, the second mirror, and the third mirror preferably form a measuring head. The measuring head preferably comprises a housing in which the measurement light source, the optical receiver, in particular the first optical receiver, the first mirror, the second mirror, and the third mirror are arranged. The housing has a measurement opening through which the measurement light reflected by the first mirror can emerge to the outside and through which the measurement light reflected diffusely by the sample and the measurement light reflected specularly by the sample can pass into the interior, in particular to the second mirror or the third mirror.

The measurement light source preferably comprises a solid block in which an illumination space, a light shaping space, and a light exit space are formed. The illumination space, the light shaping space, and the light exit space are each designed as a cavity in the block. The illumination space, the light shaping space, and the light exit space preferably each have a diffusely reflective inner surface for generating or passing on diffuse light. The illumination space opens into the light shaping space, with the result that light from the illumination space can enter the light shaping space. The light shaping space opens into the light exit space, with the result that light from the light shaping space can enter the light exit space.

At least one light source for generating light is at least partially arranged in the illumination space. The at least one light source is in any case arranged in such a way that it can be used to radiate light into the illumination space, wherein the at least one light source can be partially located outside the illumination space.

The light exit space has the light exit through which light can emerge from the light exit space to the outside of the block. The light emerging from the light exit forms the measurement light that can be generated by the measurement light source.

An axis of the illumination space and an axis of the light exit space are preferably arranged at a distance from one another. The axis of the illumination space is preferably formed by a central axis of the illumination space. The axis of the light exit space is preferably formed by a central axis of the light exit space. An axis of the light exit and the axis of the light exit space preferably coincide. The illumination space is preferably designed for light propagation of the diffuse light in a first light propagation direction in the illumination space that lies in the axis of the illumination space. The light exit space is preferably designed for light propagation of the diffuse light in a second light propagation direction in the light exit space that lies in the axis of the light exit space. The axis of the illumination space and the axis of the light exit space are arranged so far apart from one another that the illumination space and the light exit space are arranged one next to the other or one above the other.

The light shaping space is preferably designed for a reversal of a light propagation direction of the diffuse light. Consequently, the light entering the light shaping space from the illumination space undergoes a reversal of its light propagation direction as it propagates through the light shaping space, with the result that it enters the light exit space from the light shaping space with a reversed light propagation direction. Consequently, the measurement light source can have a very compact design.

The measurement light that can be generated with the measurement light source exhibits a deviation of preferably at most 0.2% in its spatial illuminance distribution.

The light that can be generated by the light source is preferably reflected at least three times in the illumination space, in the light shaping space, and in the light exit space before it emerges from the light exit. The light that can be generated by the light source is preferably reflected at least four times in the illumination space, in the light shaping space, and in the light exit space before it emerges from the light exit. A predominant part of the light that can be generated by the light source is preferably reflected many times in the illumination space, in the light shaping space, and in the light exit space before it emerges from the light exit.

The first light propagation direction and the second light propagation direction are preferably aligned opposite one another. The first light propagation direction and the second light propagation direction have an angle with respect to one another that is preferably 180°±30°, more preferably 180°±15°, and particularly preferably 180°. The light shaping space connects the illumination space and to the light exit space, preferably in a U-shaped or V-shaped manner.

The axis of the illumination space and the axis of the light exit space are preferably arranged parallel to one another. The illumination space and the light exit space preferably have the same axial position, i.e. the same position in the axial direction. The illumination space and the light exit space are thus arranged one next to the other or one above the other and without any offset in the axial direction. In this respect, the illumination space, the light shaping space, and the light exit space form a U shape or a V shape, wherein the illumination space and the light exit space form the legs of the U shape or V shape.

A homogenizer element is preferably arranged at a transition from the light shaping space to the light exit space. The homogenizer element has a diffusely reflective illumination surface. The homogenizer element is designed to reflect the light reflected by the inner surface of the light exit space through the light exit to the outside of the block. The homogenizer element is preferably arranged in the axis of the light exit space and perpendicular to that axis. The homogenizer element preferably lies opposite the light exit in this axis. When looking from the outside through the light exit into the light exit space, the homogenizer element will be seen. The transition from the light shaping space to the light exit space is visually concealed in a radially central section with respect to the axis of the light exit space preferably by the homogenizer element, wherein a radially outer section forms a light passage from the light shaping space into the light exit space. The homogenizer element preferably has the shape of a flat or curved plate. The curved plate is preferably curved spherically. The homogenizer element is preferably mounted on a web, which is arranged in a central plane of the light exit space. The central plane of the light exit space preferably also forms a central plane of the illumination space and/or a central plane of the light shaping space.

The illumination space preferably has at least one light entry, in which the at least one light source is at least partially arranged. The at least one light entry is preferably formed by an opening in the block, in which the at least one light source is arranged. The illumination space preferably has two of the light entries, to be precise a first light entry and a second light entry. The first light entry and the second light entry are preferably arranged one next to the other. At least one of the light sources is arranged in each of the light entries. A plurality of the light sources can in each case also be arranged in one or both of the light entries. The illumination space can also have more than two of the light entries. The more than two light entries can be arranged in two adjacent groups.

The two light entries or the two groups of the light entries represent two channels for the illumination. The two-channel illumination allows, for example, a selection from different illumination spectra. The two-channel illumination can, among other things, also prevent thermal overloading of the measurement light source. The two channels can be used in alternation. In relation to the central plane of the light exit space, which preferably also forms the central plane of the illumination space and of the light shaping space, the solid block is preferably formed symmetrically with the illumination space, the light shaping space, and the light exit space. A connecting line between the two light entries or a connecting line between the two groups of the light entries is preferably arranged perpendicular to the central plane of the light exit space.

In preferred embodiments, in each case a halogen lamp and a plurality of LEDs, which form the light sources of the measurement light source, are arranged in the first light entry or in the first group of the light entries and in the second light entry or in the second group of the light entries. This is preferably in each case one halogen lamp and a plurality of LEDs, preferably at least four LEDs and more preferably at least 10 LEDs. With alternative preference, at least one halogen lamp, which forms one of the light sources, is arranged in the first light entry or in the first group of light entries, whereas a plurality of LEDs, which form further ones of the light sources of the measurement light source, are arranged in the second light entry or in the second group of light entries. Preferably at least four LEDs and more preferably at least 10 LEDs are arranged in the second light entry or in the second group of light entries.

The plurality of LEDs, in particular the at least four LEDs, have in their sum an emission spectrum that preferably covers the visible range of light and more preferably the range from 340 nm to 1100 nm and even more preferably the range from 340 nm to 1620 nm.

The at least one light source can also be formed by a flash lamp, a xenon flash lamp, a deuterium lamp, an IR radiator, a white LED, a UV cathode or a UV LED. The light source can also comprise one or more optical waveguides via which the light can radiate into the illumination space. In this respect, for example, the halogen lamp can be arranged outside the illumination space. In any case, the optical waveguide or the optical waveguides open(s), as parts of the light source, into the illumination space, with the result that the light source is partially arranged in the illumination space.

In the case of two-channel illumination, the homogenizer element preferably has two lateral extensions in order to prevent light from the two channels, which has only been reflected a few times, from entering the light exit space. A connecting line between the lateral extensions is preferably arranged perpendicular to the central plane of the light exit space.

The measurement light source preferably comprises a lens element, which is arranged outside the block in front of the light exit. The lens element enlarges the beam of the measurement light emerging from the light exit in order to allow the full illumination of larger areas.

In preferred embodiments, the solid block has the basic shape of a cuboid or a cube having two beveled edges that form outer surfaces of the light shaping space.

In preferred embodiments, the solid block comprises at least two sub-blocks, which are firmly connected to one another. In the case of two-channel illumination in particular, the solid block preferably comprises three of the sub-blocks, which are firmly connected to one another. A connecting plane between a first of the three sub-blocks and a central second of the three sub-blocks intersects the first light entry. A connecting plane between the central second of the three sub-blocks and a third of the three sub-blocks intersects the second light entry. The connecting plane between the first sub-block and the second sub-block and the connecting plane between the second sub-block and the third sub-block are preferably aligned parallel to one another. The connecting plane between the first sub-block and the second sub-block and the connecting plane between the second sub-block and the third sub-block are preferably arranged parallel to the central plane of the light exit space. The light exit is preferably formed in the central second sub-block. The homogenizer element and, if desired, the web are preferably formed in the central second sub-block.

In preferred embodiments, the block or the sub-blocks consist(s) of polytetrafluoroethylene (PTFE). This material is very highly diffusely reflective. The illumination space, the light shaping space, and the light exit space have a diffusely reflective surface with a reflectance of preferably at least 96% and particularly preferably at least 98% in the entire light spectrum.

The measurement light source preferably has a small design, which means that the block has outer edges, the lengths of which are preferably not greater than 90 mm, more preferably not greater than 70 mm. Between the illumination space, the light shaping space, and the light exit space, the material of the solid block, in particular the polytetrafluoroethylene, has a wall thickness that is preferably not greater than 12 mm and more preferably not greater than 10 mm. This wall thickness is preferably at least 6 mm.

BRIEF DESCRIPTION OF THE DRAWINGS

Further details and developments of the invention will become apparent from the following description of preferred embodiments of the invention, with reference being made to the drawing. In the figures.

DETAILED DESCRIPTION OF THE INVENTION

Figure 1:
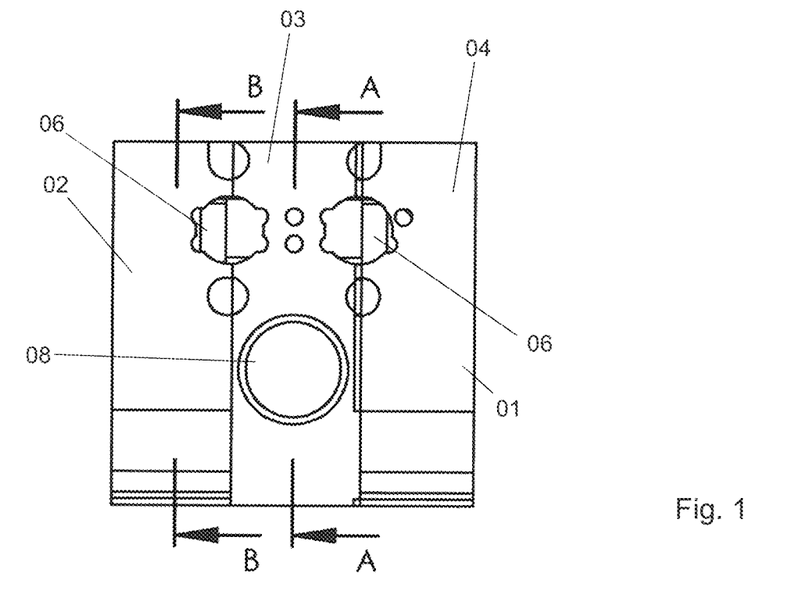
FIG. 1: shows a side view of a measurement light source of a preferred embodiment of a measurement arrangement according to the invention.

FIG. 1 shows a side view of a measurement light source of a preferred embodiment of a measurement arrangement according to the invention. The measurement light source comprises a solid block 01 made of PTFE. The block 01 consists of a first sub-block 02, a second sub-block 03, and a third sub-block 04, which are permanently connected to one another or are monolithic. The block 01 has two light entries 06 arranged one next to the other, in each of which a light source 07 (shown in FIG. 6) is arranged. The block 01 additionally has a light exit 08, from which the light generated by the measurement light source emerges.

Figure 3:
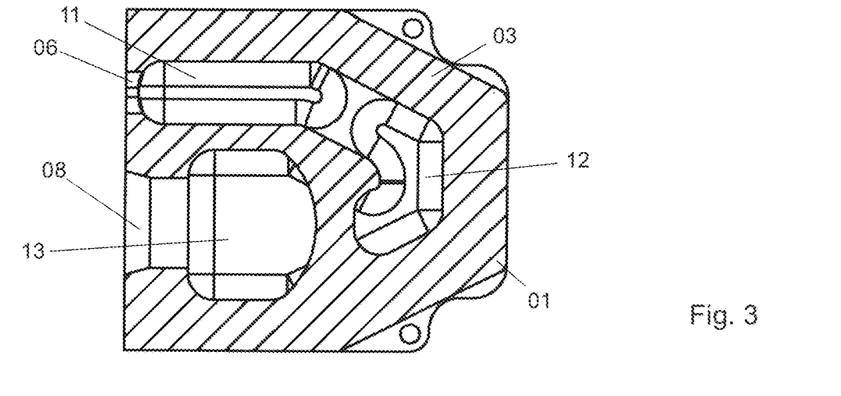
FIG. 3: shows the measurement light source shown in FIG. 1 in a first cross-sectional view.
Figure 4:
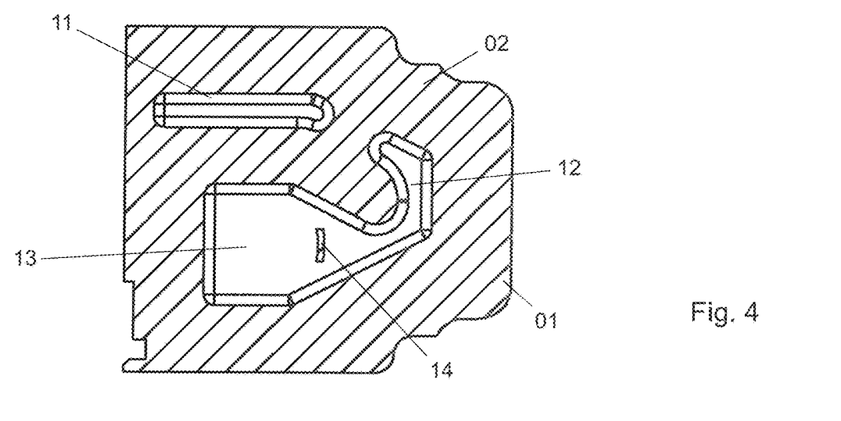
FIG. 4: shows the measurement light source shown in FIG. 1 in a second cross-sectional view.

Section marks AA for a cross-sectional view shown in FIG. 3 and section marks BB for a cross-sectional view shown in FIG. 4 are also shown.

Figure 2:
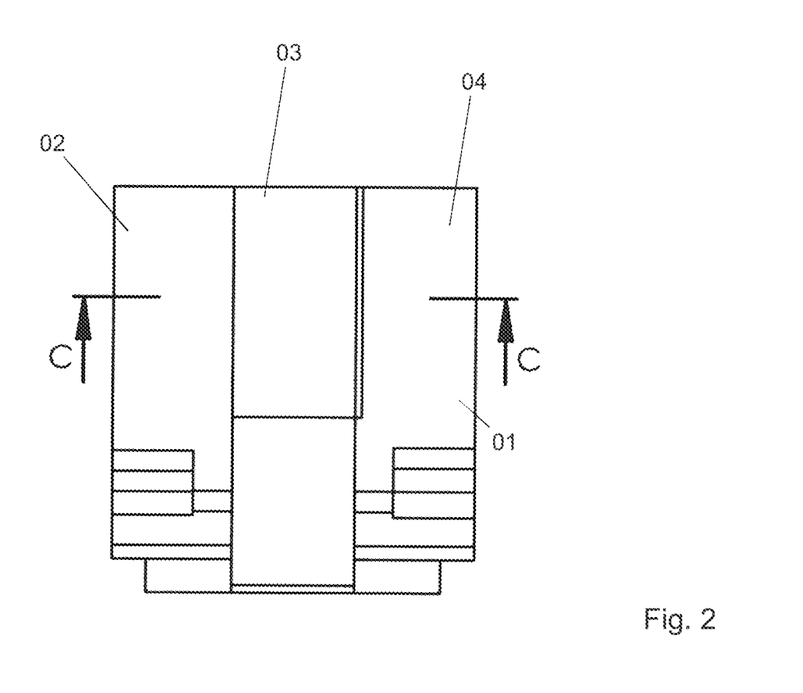
FIG. 2: shows the measurement light source shown in FIG. 1 in a view from above.

FIG. 2 shows the measurement light source shown in FIG. 1 in a view from above. Section marks CC for a cross-sectional view shown in FIG. 5 are shown.

FIG. 3 shows the measurement light source shown in FIG. 1 in a first cross-sectional view AA. This cross-sectional view shows the interior of the block 01, specifically an illumination space 11, a light shaping space 12, and a light exit space 13, which are each formed by a cavity in the block 01. The illumination space 11, the light shaping space 12, and the light exit space 13 have a diffusely reflective surface with a reflectance of at least 98% in the entire light spectrum. The light entry 06 forms an entrance into the illumination space 11. The illumination space 11 opens into the light shaping space 12. The light shaping space 12 opens into the light exit space 13. The light shaping space 12 represents a U-shaped connection between the illumination space 11 and the light exit space 13. As a result, the illumination space 11 and the light exit space 13 are arranged one above the other in a space-saving manner. The light shaping space 12 is arranged laterally next to the illumination space 11 and the light exit space 13.

FIG. 4 shows the measurement light source shown in FIG. 1 in a second cross-sectional view BB. In this cross-sectional view, the illumination space 11, the light shaping space 12, and the light exit space 13 are again shown, wherein they have a smaller cross section in comparison with the representations in FIG. 3. In this cross-sectional view, a homogenizer element 14 is shown in the form of a spherical plate, which is located in the light exit space 13 and is arranged opposite the light exit 08 (shown in FIG. 3).

Figure 5:
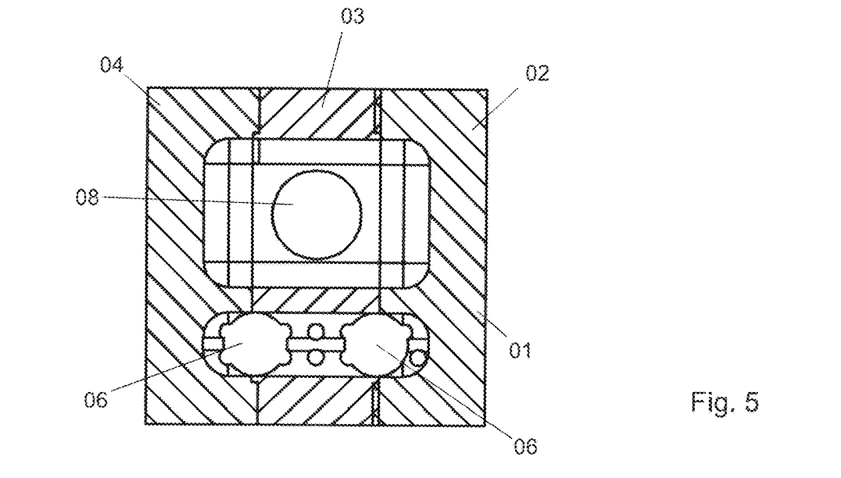
FIG. 5: shows the measurement light source shown in FIG. 1 in a third cross-sectional view.

FIG. 5 shows the measurement light source shown in FIG. 1 in a third cross-sectional view CC. In this cross-sectional view, the light entries 06 and the light exit 08 are shown, among other things.

Figure 6:
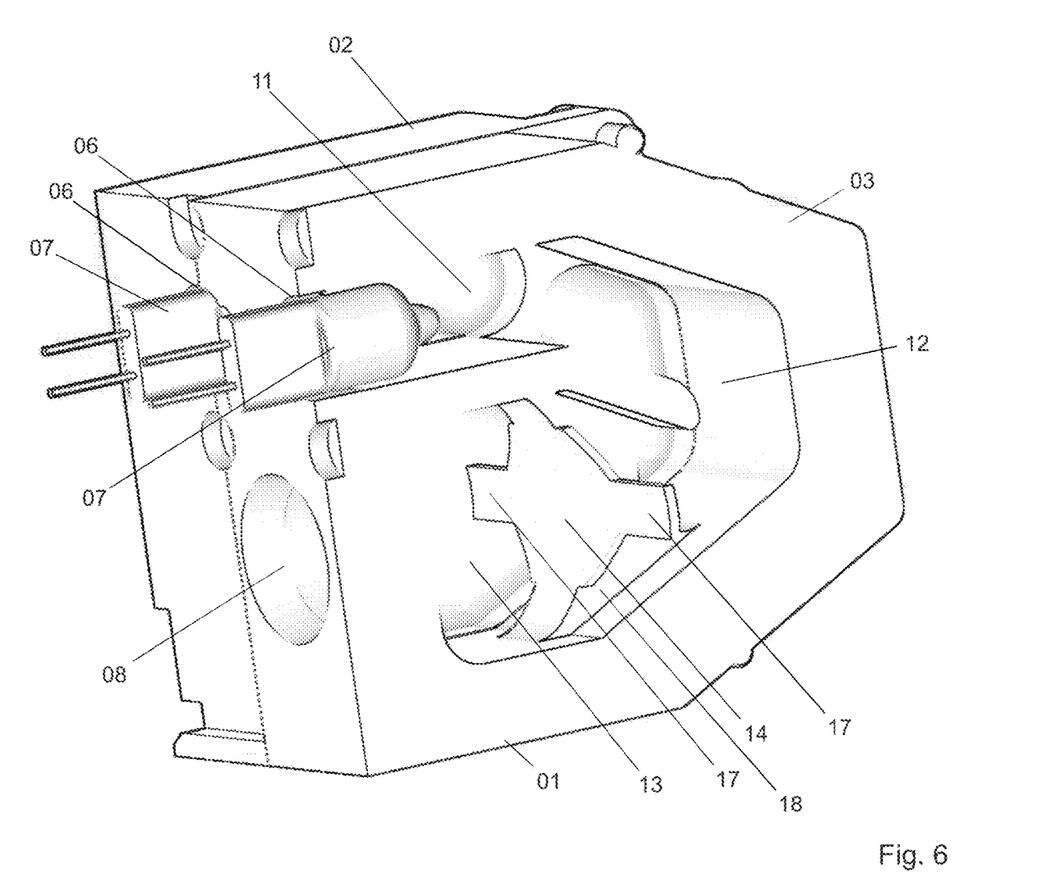
FIG. 6: shows the measurement light source shown in FIG. 1 in a perspective sectional view.

FIG. 6 shows the measurement light source shown in FIG. 1 in a perspective sectional view. In this perspective sectional view, the spatial dimensions of the illumination space 11, the light shaping space 12, and the light exit space 13 are shown. One of the two light sources 07, which in the embodiment shown are formed, for example, by halogen lamps, is arranged in each of the two light entries 06. The two light sources 07 give rise to a two-channel design of the measurement light source. Accordingly, the illumination space 11, the light shaping space 12, and the light exit space 13 have a corresponding extent perpendicular to the cross-sectional plane shown here, i.e. the illumination space 11, the light shaping space 12, and the light exit space 13 and also the measurement light source in their entirety have an increased width for the two-channel design.

In this perspective sectional view, the homogenizer element 14 is additionally shown. The homogenizer element 14 has two lateral rectangular extensions 17, which prevent light from the two channels, which was only reflected a few times, from entering the light exit space 13. The homogenizer element 14 is held in the central second sub-block 03 by a web 18.

Figure 7:
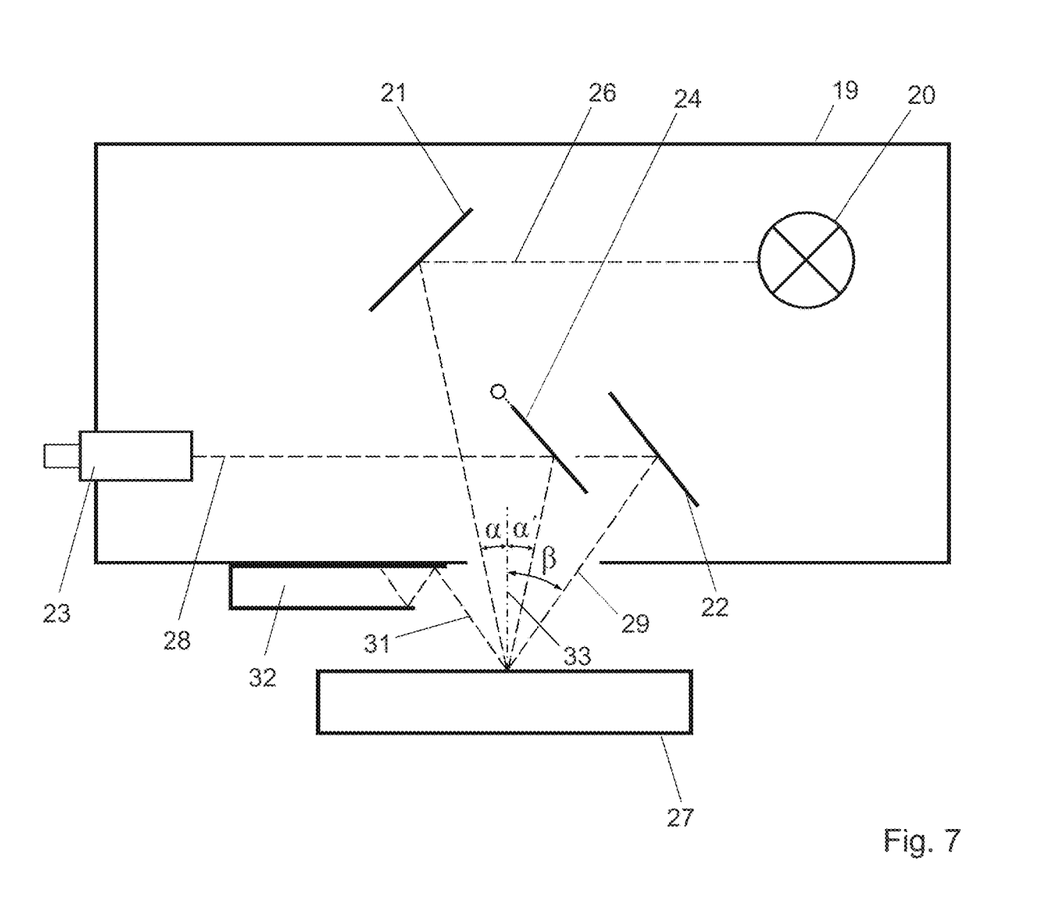
FIG. 7: shows a simplified sectional view of a preferred embodiment of the measurement arrangement according to the invention during a measurement of specularly reflected light.

FIG. 7 shows a simplified sectional view of a preferred embodiment of the measurement arrangement according to the invention during a measurement of specularly reflected light. The measurement arrangement comprises a housing 19 and a measurement light source 20, which is preferably designed like the measurement light source shown in FIG. 1. The measurement arrangement comprises a first mirror 21, on which the measurement light from the measurement light source 20 is incident. The first mirror 21 is arranged in a fixed manner. The measurement arrangement additionally comprises a second mirror 22, which is directed fixedly onto an optical receiver 23. The measurement arrangement additionally comprises a third mirror 24, which is adjustable in its alignment and is illustrated in a first position. In this first position, the light emerging from the measurement light source 20 has a first beam path 26, which extends via the first mirror 21 to a sample 27. Light that is specularly reflected by the sample 27 has a second beam path 28, which extends via the third mirror 23 in its first position to the optical receiver 23. Light that is diffusely reflected by the sample 27 has a third beam path 29, which is incident via the second mirror 22 on a rear side of the third mirror 23 in its first position, where this third beam path 29 terminates. Consequently, the third mirror 23 in its first position blocks the path for the diffusely reflected light to the optical receiver 23. Further light reflected diffusely by the sample 27 has a fourth beam path 31, which is incident on a gloss trap 32, in which this fourth beam path 31 terminates.

The light in the first beam path 26 has an entrance angle α of 10° with respect to a vertical 33 on the sample 27. The specularly reflected light in the second beam path 28 has an exit angle α' of likewise 10° with respect to the vertical 33 on the sample 27.

The third mirror 24 is composed of a black glass and has a reflectance of approximately 0.04 (=4%). In this way, the light in the second beam path 28 is attenuated by approximately 96% before it arrives at the optical receiver 23.

The diffusely reflected light in the third beam path 29 has an exit angle β of 35° with respect to the vertical 33 on the sample 27.

A distance between the housing 19 and the sample 27 is 30 mm by way of example.

Figure 8:
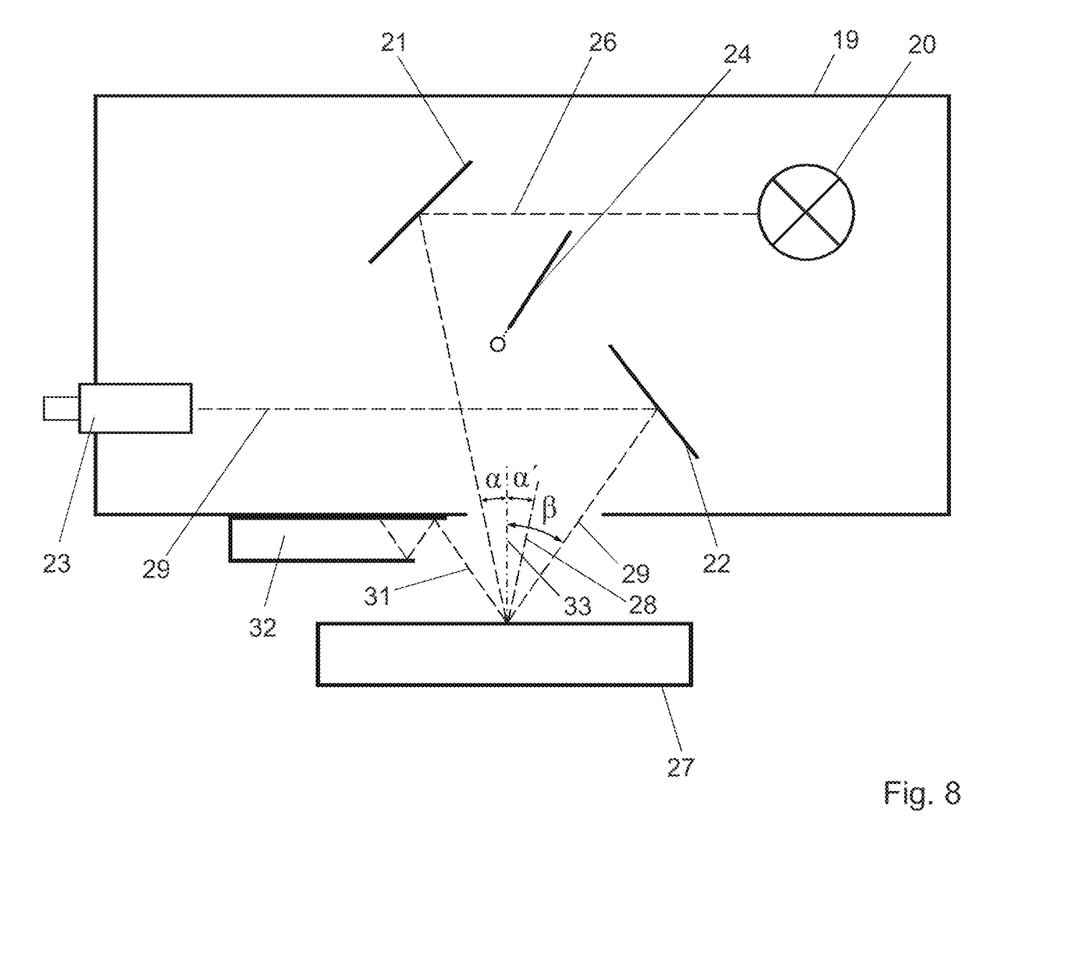
FIG. 8: shows the measurement arrangement shown in FIG. 7 during a measurement of diffusely reflected light.

FIG. 8 shows the measurement arrangement shown in FIG. 7 during a measurement of diffusely reflected light. For this purpose, the third mirror 24 is in a second position. In this second position, said mirror releases the third beam path 29 of the light reflected diffusely by the sample 27 so that it arrives at the optical receiver 23. Since the second mirror 22 reflects almost completely, the light in the third beam path 29 is hardly attenuated. However, the light reflected diffusely by the sample 27 is already significantly weaker than the light that is reflected specularly by the sample 27, with the result that the light arriving at the optical receiver 23 in the measurement shown in FIG. 1 and the light arriving at the optical receiver 23 in the measurement shown in FIG. 2 are of similar intensity.

Figure 9:
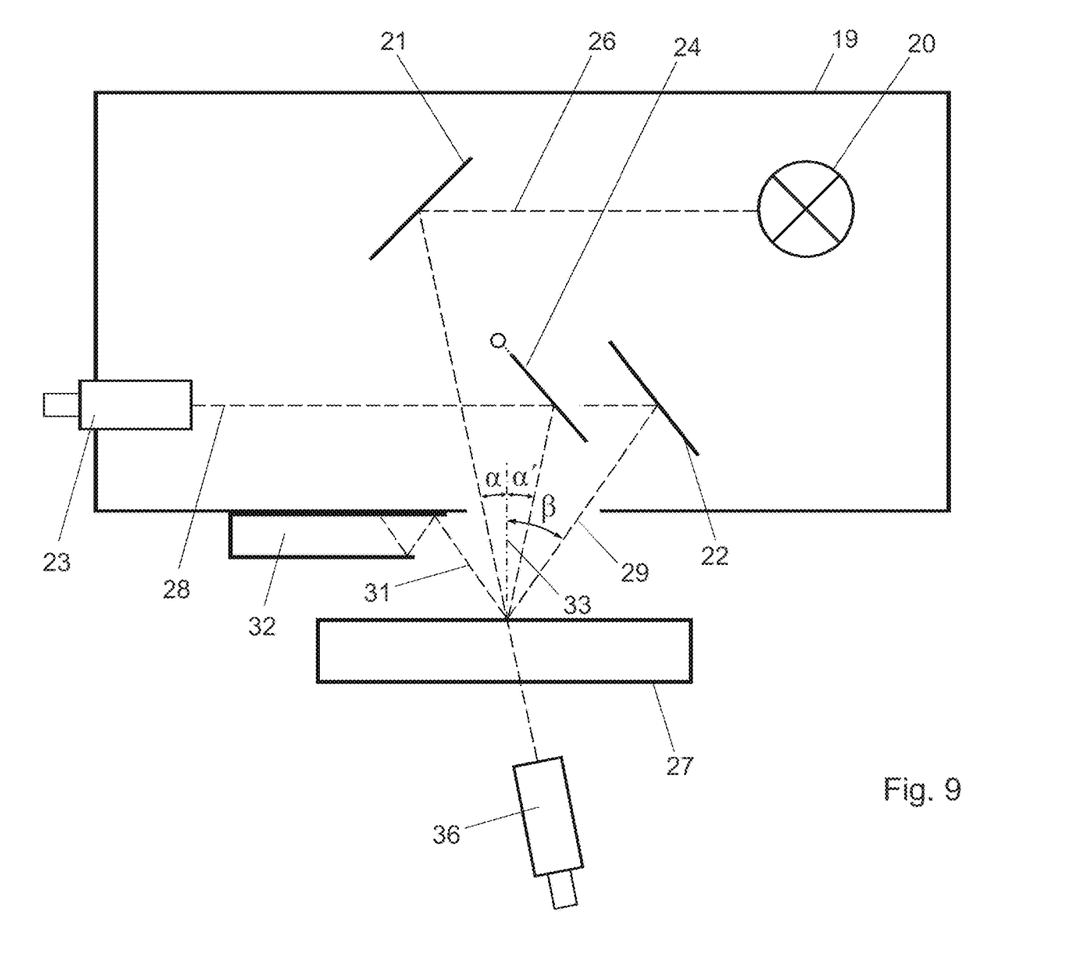
FIG. 9: shows the measurement arrangement shown in FIG. 7 during a transmission measurement.

FIG. 9 shows the measurement arrangement shown in FIG. 7 during a transmission measurement, for which the measurement arrangement furthermore comprises a further optical receiver 36 below the sample 27. The light in the first beam path 26 that was not reflected by the sample 27 and passes through the sample 27 is incident on the further optical receiver 36, with which it is measured. The third mirror 24 is in its first position.

Figure 10:
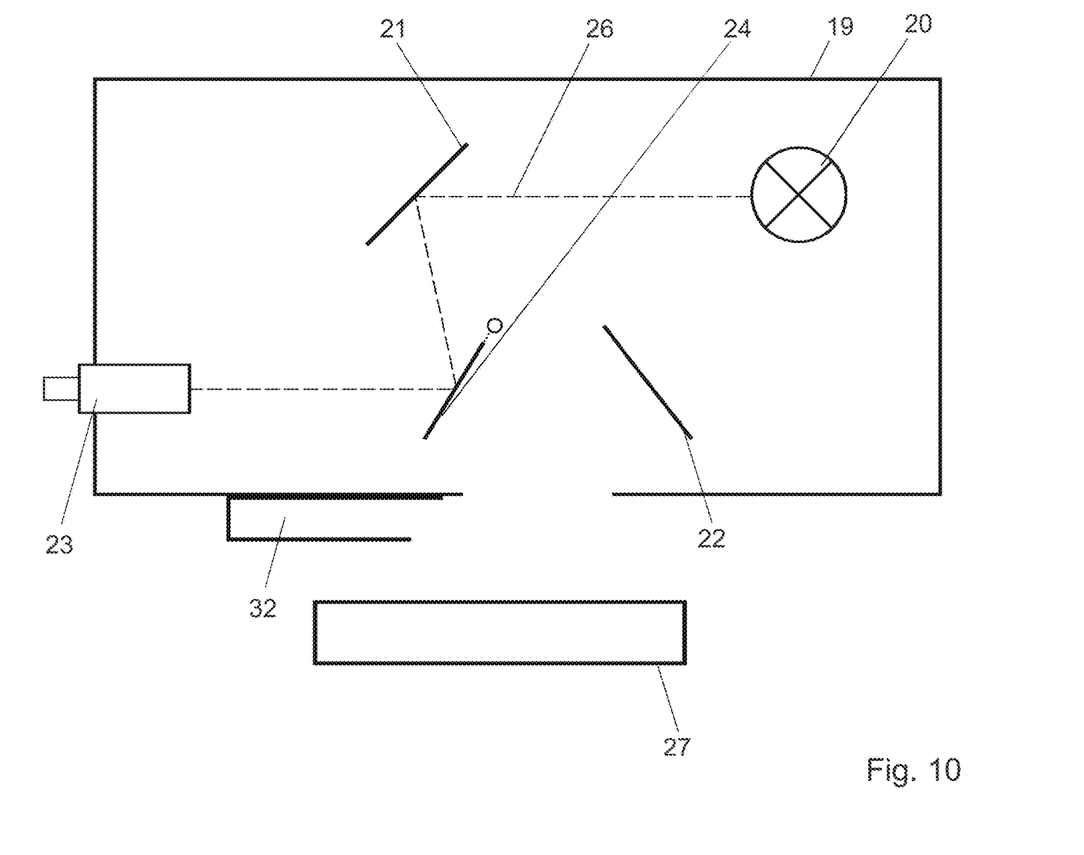
FIG. 10: shows the measurement arrangement shown in FIG. 7 during a bright measurement.

FIG. 10 shows the measurement arrangement shown in FIG. 7 during a bright measurement. For this purpose, the third mirror 24 is in a third position. In this third position, the third mirror 24 is aligned for directing the measurement light in the first beam path 26 to the optical receiver 23. In this way, the measurement light from the measurement light source 20 passes, after it was reflected by the first mirror 21 and by the third mirror 24, directly to the optical receiver 23, without it having been reflected by the sample 27.

Figure 11:
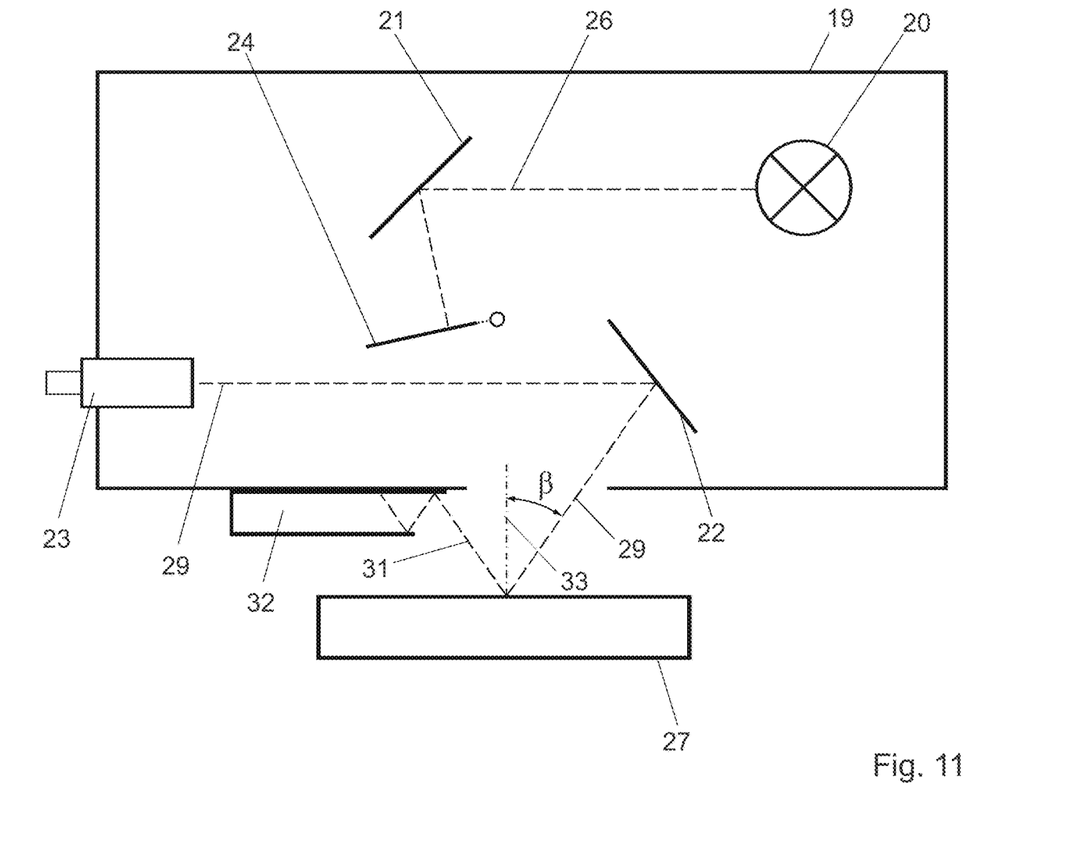
FIG. 11: shows the measurement arrangement shown in FIG. 7 during a dark measurement.

FIG. 11 shows the measurement arrangement shown in FIG. 7 during a dark measurement. For this purpose, the third mirror 24 is in a fourth position. In this fourth position of the third mirror 24, the latter is aligned for reflecting the measurement light in the first beam path 26 that was reflected by the first mirror 21 back to the first mirror 21. Consequently, no measurement light passes from the measurement light source 20 to the optical receiver 23. Any ambient light that may be diffusely reflected by the sample 27 passes along the third beam path 29, via the second mirror 22, to the optical receiver 23. Consequently, the influence of this undesirable ambient light can be measured and taken into account when measuring the sample 27.

The invention claimed is:

1. A measurement arrangement for measuring diffusely reflected light and specularly reflected light; comprising:
   a measurement light source for generating measurement light, which has a light exit for the emergence of measurement light;
   an optical receiver for receiving measurement light, which is arranged opposite the measurement light source;
   a first mirror, which is arranged on an axis of the light exit and is aligned for reflecting the measurement light emerging from the light exit;
   a second mirror, which is arranged on an axis of the optical receiver and is aligned for reflecting diffusely reflected measurement light to the optical receiver; and
   a third mirror, which is settable in at least two positions, wherein the third mirror is arranged in a first position between the optical receiver and the second mirror and is aligned for directing the measurement light that was directed onto a sample by the first mirror and specularly reflected by the sample to the optical receiver, wherein the third mirror in a second position releases a beam path between the second mirror and the optical receiver, with the result that the measurement light that was directed onto the sample by the first mirror and diffusely reflected by the sample to the second mirror is directed to the optical receiver by the second mirror; and wherein the third mirror has a reflectance of at most 0.5.

2. The measurement arrangement as claimed in claim 1, wherein the third mirror has a reflectance of at most 0.1.

3. The measurement arrangement as claimed in claim 2, wherein the third mirror is formed by a black glass.

4. The measurement arrangement as claimed in claim 1, wherein the measurement light directed onto the sample by the first mirror has an angle of incidence with respect to a vertical aligned perpendicularly to the sample and is incident on the sample in a vertical foot point of the vertical, wherein the angle of incidence is between 5° and 20°.

5. The measurement arrangement as claimed in claim 4, wherein a connecting line between the vertical foot point of the vertical and a center of the second mirror has an angle with respect to the vertical that represents an exit angle for the diffusely reflected measurement light that is between 25° and 40°, wherein the sum of the angle of incidence and of the exit angle is 45°.

6. The measurement arrangement as claimed in claim 1, wherein the measurement arrangement further comprises a gloss trap arranged on the side of the vertical that is opposite the second mirror.

7. The measurement arrangement as claimed in claim 6, wherein a connecting line between the vertical foot point of the vertical and the gloss trap has an angle with respect to the vertical that is identical to the exit angle of the diffusely reflected measurement light.

8. The measurement arrangement as claimed in claim 1, wherein the axis of the light exit of the measurement light source, a first vertical on the first mirror, a second vertical on the second mirror, a third vertical on the third mirror, and the axis of the optical receiver are arranged in one plane.

9. The measurement arrangement as claimed in claim 1, wherein the optical receiver forms a first optical receiver, and in that the measurement arrangement comprises a second optical receiver, which is arranged on a side of the sample that is opposite the first optical receiver, wherein the measurement light directed onto the sample by the first mirror is also directed through the sample to the second optical receiver.

10. The measurement arrangement as claimed in claim 1, wherein the measurement light source comprises a solid block, in which an illumination space, a light shaping space, and a light exit space are each formed as a cavity in the block and have a diffusely reflective inner surface; wherein the illumination space opens into the light shaping space; wherein the light shaping space opens into the light exit space; wherein at least one light source for generating light is at least partially arranged in the illumination space; wherein the light exit space has a light exit; wherein an axis of the illumination space and an axis of the light exit space are arranged at a distance from one another; wherein the light shaping space is designed for a reversal of a light propagation direction; and wherein the axis of the illumination space and the axis of the light exit space are arranged parallel to one another, wherein the illumination space and the light exit space have the same axial position.

\* \* \* \* \*